UNITED STATES PATENT OFFICE 2,555,469

DRILLING MUD AND METHOD OF USING

Rufus V. Jones, Bartlesville, Okla., assignor to Phillips Petroleum Company, a corporation of Delaware No Drawing. Application November 22, 1948,
Serial No. 61,529

12 Claims. (Cl. 252—8.5)

This invention relates to aqueous drilling muds. In one of its more specific aspects, it relates to aqueous drilling muds suitable for drilling through heaving shale formations. In another specific aspect, it relates to aqueous drilling muds which are not subject to attack by salt waters encountered in drilling. In still another aspect, it relates to a method of drilling and controlling wells.

In the art of drilling wells by the rotary method, it is necessary to use a drilling mud, or fluid, as is well understood by those skilled in the art. The drilling mud lubricates the drill stem, carries cuttings to the surface, where they are removed from the mud stream, forms a filter cake on the wall of the well to prevent the loss of any substantial amount of water from the drilling mud to the formations penetrated which, in turn, reduces the caving of heaving shales as a result of absorbing water, and also creates a hydrostatic head against the walls of the bore hole to thereby reduce the flow of underground fluids such as oil or connate water into the bore hole.

To perform these important functions, it is necessary that the drilling mud have suitable viscosity, gel strengths and water-loss properties at all times during the drilling. Normally, muds of fairly high density and viscosity are used but by operating at a high mud velocity, it is possible to use a mud of low viscosity and still remove the cuttings satisfactorily. However, when operating with a mud of low viscosity, there is one serious hazard against which precautions must be taken. If the mud is of fairly low viscosity and the mud flow is stopped for any reason, the cuttings will settle out more rapidly than with a high viscosity mud and there is danger that the drill bit will be jammed in the bore hole and irretrievably lost. This hazard can be partially guarded against by using a drilling mud which contains gel-forming substances, which when the mud circulation is stopped, causes the mud to gel, thereby stopping or hampering the falling out of heavy particles. The gel-forming agents generally used are highly colloidal clays of the bentonitic type. In order to maintain the smooth-flowing, highly colloidal nature of drilling muds containing gel-forming colloidals, it is necessary to maintain a pH above about 8.0. At low pH's, the clay particles tend to become flocculated. Colloidal clays, such as bentonite, absorb more water in alkaline solution and give a more stable drilling mud.

Another necessary property of an aqueous drilling mud is that it be resistant to attack by salt-containing water encountered in drilling. Salt will react with ordinary drilling muds to flocculate the colloidal particels and cause the clay to separate, at least partially, from the water. This results in an inordinate increase in the viscosity, which may in turn, stop the circulation of the mud and result in a jammed drill string.

It is common practice to treat drilling mud with various chemicals to impart the desired characteristics. I have discovered that the addition of a small amount of sulfobenzyl starch to a drilling fluid will produce a greatly lowered water loss, improved gel characteristics and desirable viscosity.

Sulfobenzyl starch can be prepared by any method but a very convenient manner of preparation is to react a pure starch, such as potato starch with sodium alpha chlorotoluene sulfonate in an alkaline medium followed by precipitation of the compound by the addition of alcohol. The following equation represents the reaction by which this is accomplished.

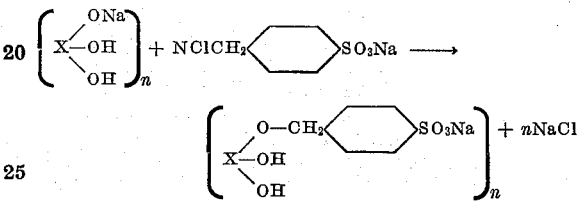

In this equation, X represents the starch repeating unit and $n$ is an integer equal to the number of such units in the starch molecule. This equation represents that one substitution is made in each unit. However, it is not necessary that each glucose unit have a substituent; only a portion of the units may be substituted.

This method of preparation is fully described in my copending application Serial No. 112,654, filed August 26, 1949.

The principal object of my invention is to provide a drilling mud having a low water loss.

Another object of my invention is to provide a drilling mud having suitable thixotropic properties.

Another object of my invention is to provide a drilling mud which is not subject to serious attack by salt water encountered in the drilling.

Still another object of my invention is to provide a process for reducing the water loss from a drilling mud employed in drilling a well.

Other objects and advantages of my invention will be apparent to those skilled in the art upon reading the following detailed description and claims.

In preparing my sulfobenzyl starch, there are three hydroxyl groups on each of the starch repeating units, commonly referred to as glucose residue units. The hydrogen of each can be replaced by the sulfobenzyl unit, as has been previously shown by the equation shown above. The average number of hydroxyl groups substituted is expressed as the degree of substitution. Obviously this can vary from 0 to 3, which is complete substitution. I prefer to use a product having a degree of substitution between 0.1 and 1.0. This is sufficient substitution to produce an excellent drilling mud additive and a higher-degree substitution is more difficult and, consequently, more costly to obtain.

The amount of sulfobenzyl starch necessary to be used normally varies from 1 to 8 pounds of sulfobenzyl starch per barrel of mud. Below one pound per barrel, the treating effect is not high enough and above about 8 pounds per barrel, the viscosity is usually too high in most muds. The exact amount depends somewhat on the type of mud being used, muds of high salt contamination requiring slightly more than muds of low salt contamination.

The exact method of adding my sulfobenzyl starch to the mud is not critical. It may be added directly to the mud pit or it may be premixed with water and then introduced into the mud stream or into the pit. The only requirement is that mixing be sufficient to dissolve all of the sulfobenzyl starch and that the additive be thoroughly mixed into the mud.

While I prefer to use one of the alkali metal salts of sulfobenzyl starch, the free acid or any of the water soluble polyvalent metals salts are entirely satisfactory. My sulfobenzyl starch is not subject to serious attack by any of the contaminants normally encountered in drilling operations, nor do the temperatures to which the mud is subjected have any deleterious effect on the additive. Drilling muds containing my sulfobenzyl starch have satisfactory gel characteristics and viscosity. All of the usual treating agents may be added to my drilling muds without harmful effects on my starch compound.

One of the most important properties of my sulfobenzyl starch is its ability to lower the water loss of drilling fluids in which it is used which means less chance of caving as a result of the hydration of heaving shales penetrated. Muds containing my starch compound have relatively thin filter cakes, which lessens the tendency of the hole to become choked, and allows a less turbulent flow of the mud through the hole.

A suitable mud for drilling may comprise, in combination, any finely divided suspended material such as clay, kaolin and/or bentonitic materials in sufficient amounts to form a filter cake on the walls of the well, sufficient water to maintain the mud fluid, and a sufficient amount of my sulfobenzyl starch to give a satisfactory water loss without increasing the viscosity of the mud to such an extent that it cannot be circulated.

Other advantages and desirable features of my invention will be apparent from a study of the following tests and claims.

TEST I

To determine the effectiveness of my sulfobenzyl starch as a drilling mud additive, particularly as a water loss reducer, three different muds were mixed and portions of each were tested with different amounts of sulfobenzyl starch added. The barium sulfate is representative of the numerous weighting agents known to the prior art, all of which may be added in the usual amounts to the drilling mud of the present invention to give a desired specific gravity.

A mixture of water with barium sulfate (or other suspended solid material) in an amount sufficient to form a filter cake, and sulfobenzyl starch in an amount sufficient to reduce the water loss but not increase the viscosity to an unpumpable degree can be used as a low water loss drilling mud, but it is preferred to have clayey materials present also. Sulfobenzyl starch and water alone are valueless as that mixture does not form a filter cake even when enough sulfobenzyl starch is used to make the solution entirely too viscous to pump through a drill string and well bore.

Table 1 shows the compositions of the various base muds used in testing my invention. The figures are the weight per cent for the respective materials.

Table 1

| Mud | Kaolin | Ezmix | Bentonite | CaSO$_4$ | BaSO$_4$ | NaCl | H$_2$O |
|---|---|---|---|---|---|---|---|
| I   | 20 |      | 2.0  |      | 17.5  |       | 60.5 |
| II  |    | 6.9  | 0.69 | 0.17 | 25.00 |       | 67.24 |
| III |    | 6.08 | 0.61 | 0.15 | 21.98 | 12.00 | 59.18 |

TEST II

The indicated amounts of a sulfobenzyl starch having a degree of substitution of 0.27 were added to portions of the base muds from Test I. The properties of the resulting muds were determined according to the standard procedures and the results as shown in Table 2.

Table 2

| Mud | lbs./bbl. | Viscosity, cps. | Initial gel, gms. | 10 min. gel, gms. | H$_2$O loss, 30 min. | pH |
|---|---|---|---|---|---|---|
| I   | 0 | 18   | 0  | 5   | 17   | 7.9 |
| I   | 1 | 20   | 0  | 2   | 7.0  | 7.8 |
| I   | 2 | 82.5 | 4  | 15  | 4.3  | 7.7 |
| I   | 4 | >100 | 30 | 60  | 3.2  | 7.8 |
| I   | 6 | >100 | 55 | 280 | 1.5  | 8.2 |
| II  | 0 | 9.5  | 14 | 22  | 63   | 7.8 |
| II  | 1 | 33   | 25 | 45  | 47   | 7.8 |
| II  | 2 | 46.5 | 30 | 70  | 18   | 8.0 |
| II  | 4 | 74   | 40 | 80  | 5.5  | 8.0 |
| II  | 6 | 98   | 45 | 110 | 3.6  | 8.1 |
| III | 0 | 14   | 15 | 15  | 64   | 7.2 |
| III | 1 | 13   | 5  | 20  | 102  | 7.2 |
| III | 2 | 17   | 10 | 25  | 118  | 7.1 |
| III | 4 | 26   | 18 | 25  | 78.5 | 7.1 |
| III | 6 | 34   | 15 | 40  | 45.5 | 7.2 |

TEST III

An aqueous solution of my sulfobenzyl starch in the amount of four pounds per barrel will have a complete water loss in less than a minute. That is, 100 cc. of the aqueous solution will filter through standard test paper in less than a minute.

The mechanism by which my sulfobenzyl starch operates to produce a drilling mud having a low water loss is not entirely understood, but it is believed that it acts as a dispersing agent to further disperse the finely divided clay in a drilling mud and also acts to seal the pores between clay particles adhering to the walls of the well. However, this invention is not limited to any one theory of operation or action. It is obvious that various changes may be made in the practicing of my invention without departing from the scope thereof. Obviously, use in aqueous phase mud solutions includes use in the aqueous phase of oil-emulsion muds. It is understood that this invention is not limited to the specific method described but is limited only by the following claims.

Having described my invention, I claim:

1. A water base drilling mud comprising, in combination, sufficient water to maintain the mud as a fluid, sufficient clayey material to form a filter cake on the wall of the well, and a starch compound selected from the group consisting of sulfobenzyl starch and the water soluble salts thereof in an amount sufficient to reduce the water loss due to filtration through said cake but insufficient to increase the viscosity of said drilling mud to such an extent that it cannot be circulated.

2. A water base drilling mud comprising, in combination, sufficient water to maintain the mud as a fluid, sufficient clayey material to form a filter cake on the wall of the well, water soluble sulfobenzyl starch in an amount sufficient to reduce the water loss due to filtration through said cake but insufficient to increase the viscosity of said drilling mud to such an extent that it cannot be circulated.

3. A water base drilling mud comprising, in combination, sufficient water to maintain the mud as a fluid, sufficient clayey material to form a filter cake on the wall of the well, and a water soluble alkali metal salt of sulfobenzyl starch in an amount sufficient to reduce the water loss due to filtration through said filtrate but insufficient to increase the viscosity of said drilling mud to such an extent that it cannot be circulated.

4. A water base drilling mud comprising, in combination, sufficient water to maintain the mud as a fluid, sufficient clayey material to form a filter cake on the wall of the well, and water soluble sodium sulfobenzyl starch in an amount sufficient to reduce the water loss due to filtration through said cake but insufficient to increase the viscosity of said drilling mud to such an extent that it cannot be circulated.

5. A water base well drilling fluid comprising an aqueous fluid mixture containing suspended inorganic solids which form a filter cake on the wall of the well and a water soluble starch compound selected from the group consisting of sulfobenzyl starch and the water soluble salts thereof in an amount sufficient to reduce the water loss due to filtration through said cake but insufficient to increase the viscosity of said drilling mud to such an extent that it cannot be circulated.

6. A water base well drilling fluid comprising an aqueous fluid mixture containing suspended inorganic solids which form a filter cake on the wall of the well and water soluble sulfobenzyl starch in an amount sufficient to reduce the water loss due to filtration through said cake but insufficient to increase the viscosity of said drilling mud to such an extent that it cannot be circulated.

7. A water base well drilling fluid comprising an aqueous fluid mixture containing suspended inorganic solids which form a filter cake on the wall of the well and a water soluble alkali metal salt of sulfobenzyl starch in an amount sufficient to reduce the water loss due to filtration through said cake but insufficient to increase the viscosity of said drilling mud to such an extent that it cannot be circulated.

8. A water base well drilling fluid comprising an aqueous fluid mixture containing suspended inorganic solids which form a filter cake on the wall of the well and water soluble sodium sulfobenzyl starch in an amount sufficient to reduce the water loss due to filtration through said cake but insufficient to increase the viscosity of said drilling mud to such an extent that it cannot be circulated.

9. In a process for drilling a well with well drilling tools wherein there is circulated in the well a water base drilling mud containing colloidal particles of clayey material suspended in sufficient water to render the same circulatable, the process of forming a filter cake on the wall of said well to decrease the loss of fluid from said drilling mud contained therein into surrounding earthen formation which comprises admixing with said drilling mud and interacting therewith a water soluble starch compound selected from the group consisting of sulfobenzyl starch and the water soluble salts thereof in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

10. In a process for drilling a well with well drilling tools wherein there is circulated in the well a water base drilling mud containing colloidal particles of clayey material suspended in sufficient water to render the same circulatable, the process of forming a filter cake on the wall of said well to decrease the loss of fluid from said drilling mud contained therein into surrounding earthen formations which comprises admixing with said drilling mud and interacting therewith water soluble sulfobenzyl starch in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

11. In a process for drilling a well with well drilling tools wherein there is circulated in the well a water base drilling mud containing colloidal particles of clayey material suspended in sufficient water to render the same circulatable, the process of forming a filter cake on the wall of said well to decrease the loss of fluid from said drilling mud contained therein into surrounding earthen formations which comprises admixing with said drilling mud and interacting therewith a water soluble alkali metal salt of sulfobenzyl starch in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

12. In a process for drilling a well with well drilling tools wherein there is circulated in the well a water base drilling mud containing colloidal particles of clayey material suspended in sufficient water to render the same circulatable, the process of forming a filter cake on the wall of said well to decrease the loss of fluid from said drilling mud contained therein into surrounding earthen formations which comprises admixing with said drilling mud and interacting therewith water soluble sodium sulfobenzyl starch in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

RUFUS V. JONES.

REFERENCES CITED

The following references are of record in the file of this patent:

UNITED STATES PATENTS

| Number | Name | Date |
| --- | --- | --- |
| 2,417,235 | Cannon | Mar. 11, 1947 |